M. A. DEES.
METHOD OF MAKING TIRES.
APPLICATION FILED MAR. 23, 1912.
1,184,328.
Patented May 23, 1916.
4 SHEETS—SHEET 1.
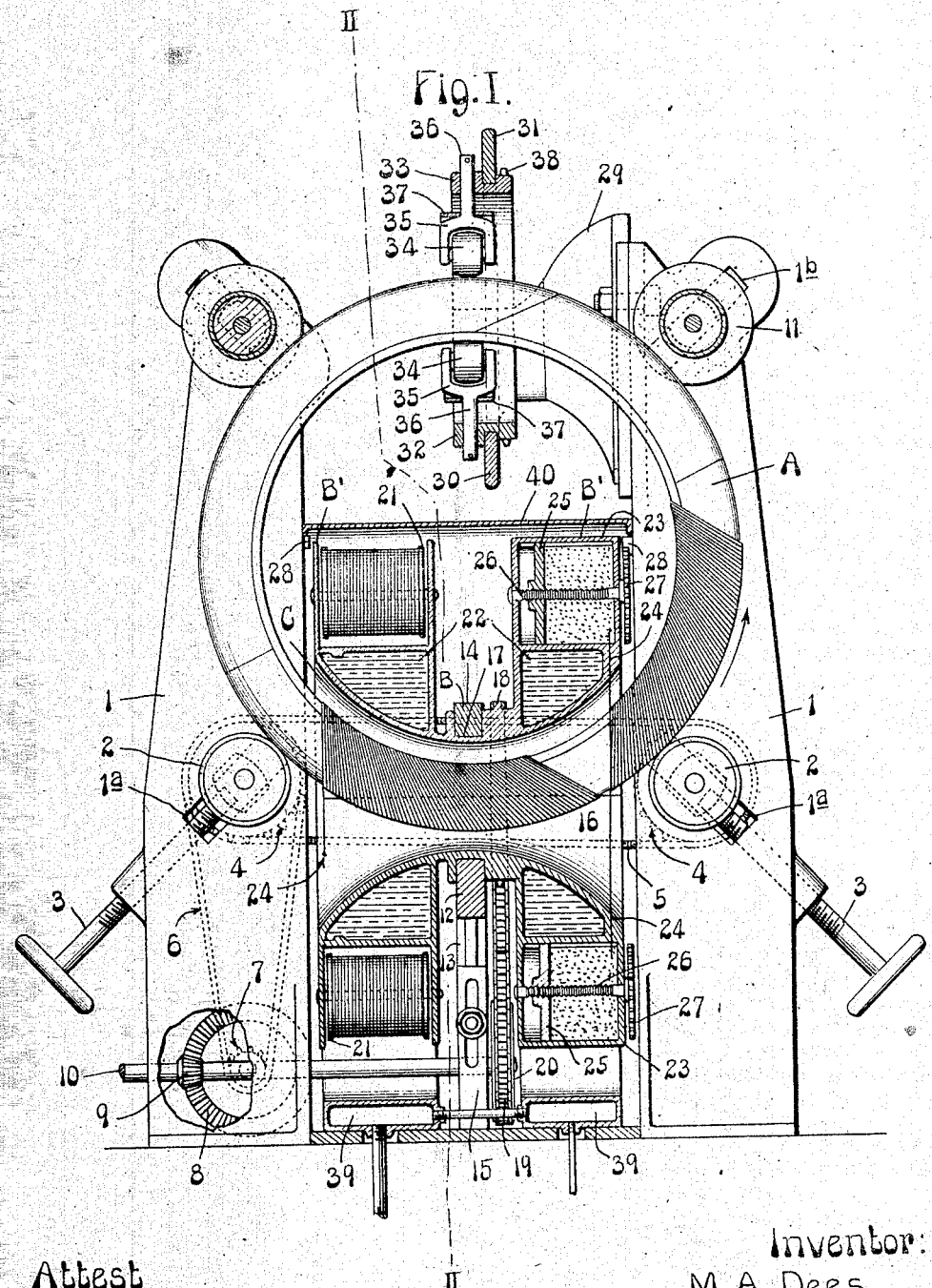
Fig. I.
Attest
Inventor:
M. A. Dees

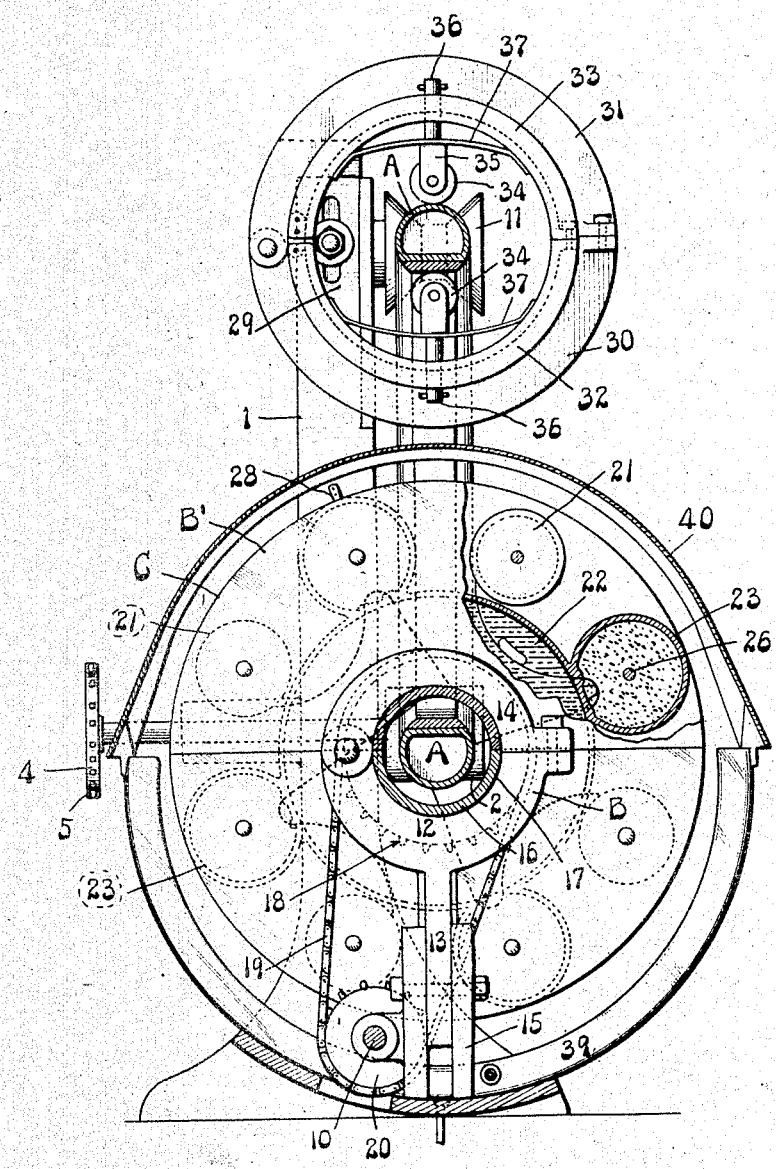

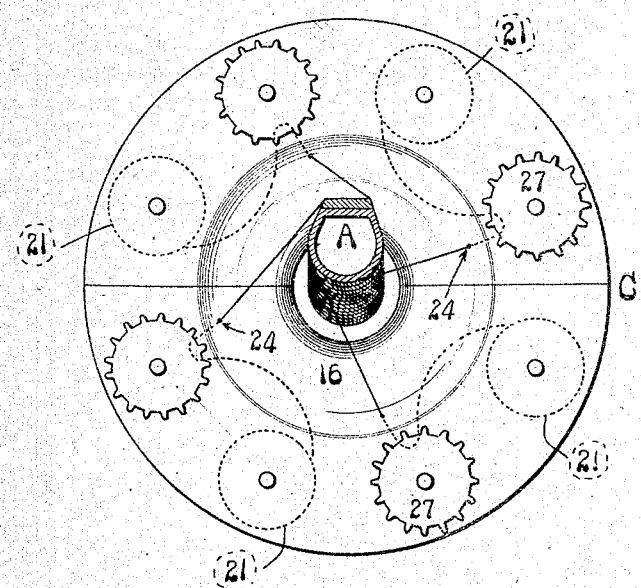
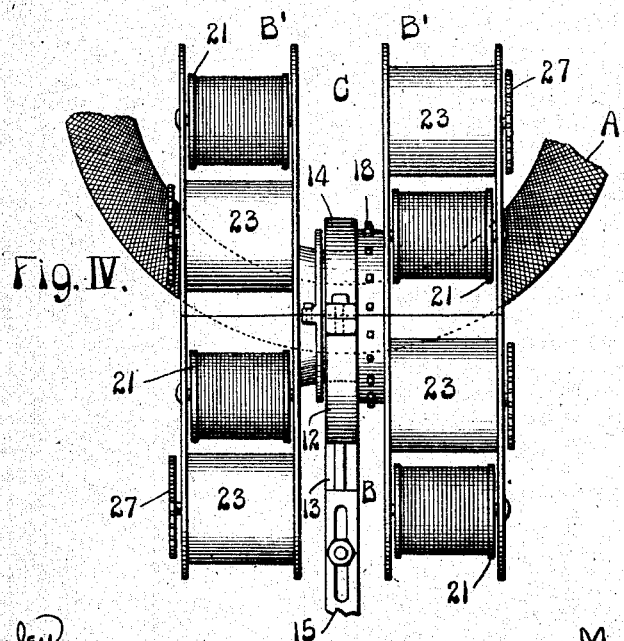

M. A. DEES.
METHOD OF MAKING TIRES.
APPLICATION FILED MAR. 23, 1912.
1,184,328.
Patented May 23, 1916.
4 SHEETS—SHEET 4.
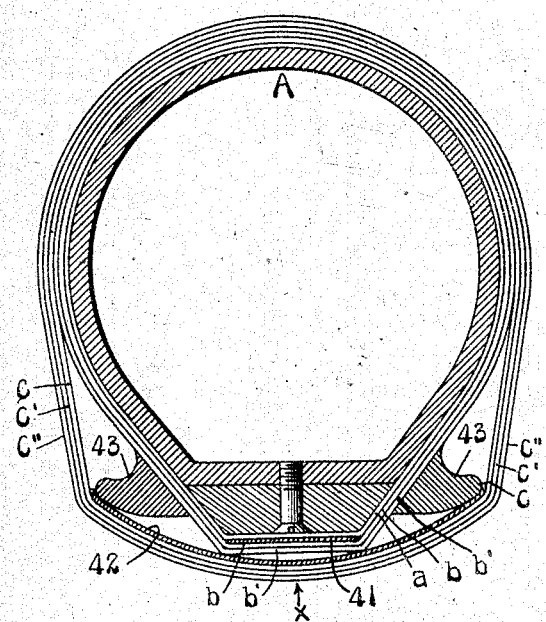
Fig. V.
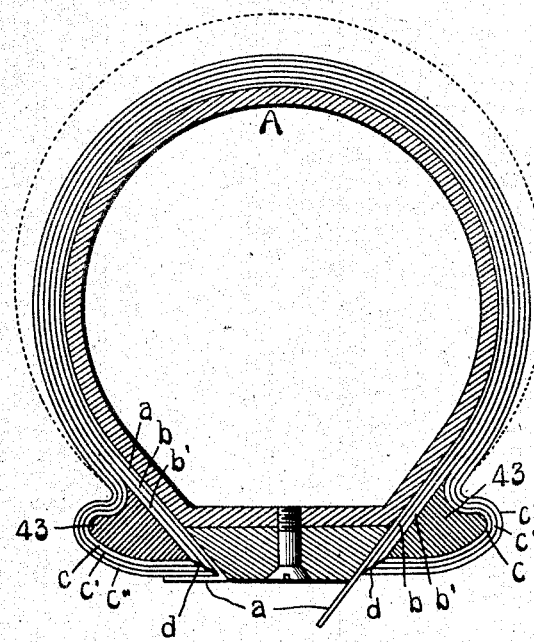
Fig. VI.
Attest
A. J. McCauley
F. B. Price
Inventor:
M. A. Dees
by
Knight & Cook
Attys.

UNITED STATES PATENT OFFICE.

MARK A. DEES, OF ST. LOUIS, MISSOURI, ASSIGNOR TO AMERICAN TIRE COMPANY, OF ST. LOUIS, MISSOURI, A CORPORATION OF MISSOURI.

METHOD OF MAKING TIRES.

1,184,328.      Specification of Letters Patent.      Patented May 23, 1916.

Application filed March 23, 1912. Serial No. 685,752.

*To all whom it may concern:*

Be it known that I, MARK A. DEES, a citizen of the United States of America, and a resident of the city of St. Louis, in the State of Missouri, have invented certain new and useful Improvements in Methods of Making Tires, of which the following is a full, clear, and exact description, reference being had to the accompanying drawings, forming a part of this specification.

My invention relates to a method of making the fabric skeletons of hollow tires of the kind used upon the wheels of motor vehicles, and in which the essential elements are fabric and rubber.

My invention has for its object to provide an improvement in those methods in the practice of which a tire skeleton fabric may be built up with the fabric threads thoroughly and uniformly rubberized before they enter into the fabric, and uniformly tensioned in the fabric; and by which the rubberized threads are laid in plies and compacted on a suitable mandrel in producing the fabric of the tire structure. These and further objects of the invention will hereinafter more fully appear.

My method may be conveniently and advantageously carried out by the use of the apparatus shown in the accompanying drawings, in which:—

Figure I is a view partly in side elevation and partly in vertical section of my apparatus, with the parts shown as they appear in building up a skeleton fabric according to my improved method. Fig. II is a vertical section taken on line II—II, Fig. I, with certain elements of said apparatus adjacent to said line shown in elevation. Fig. III is a side elevation of the reel of the apparatus, the mandrel being shown in cross section with fabric threads partly wound thereon. Fig. IV is an elevation looking at the periphery of the reel. Fig. V is a cross section of the mandrel, and the fabric skeleton thereon as laid in the use of my apparatus, the skeleton fabric threads being shown as they appear previous to their severance at the inner circumference of the mandrel to produce the separable inner edges of a tire. Fig. VI is a view similar to Fig. V, illustrating the skeleton fabric as it appears after the severance of the fabric threads and during the process of adjusting these threads into their proper positions at the separable edges of the tire.

In the drawings: 1 designates standards serving as the main supports for means by which a circular mandrel A may be supported and revolved during the process of forming the skeleton fabric structure of the tire on said mandrel. The mandrel A preferably has a cross sectional shape corresponding approximately to the shape of the inner wall of a hollow tire that is to be produced in the use of my apparatus; and which, when completed, will have separable edges at its inner circumference, such as are common to the hollow tires used on the wheels of motor vehicles.

2 designates mandrel receiving rollers adjustable upwardly and inwardly toward a common center, and downwardly and outwardly relative to said common center, which is identical in location with the axis of the mandrel A when it rests on the rollers 2. The rollers 2 may be adjusted by adjusting screws 3.

The mandrel revolving rollers 2 are cylindrical in shape in order that the mandrel, revolved by frictional contact therewith, may be turned at a uniform speed, irrespective of the size of the mandrel and irrespective of its increasing circumference during the progress of winding fabric threads thereon as provided for in the use of my apparatus. These rollers may be driven by any suitable means, such as sprocket wheels 4, and an endless drive chain 5. Operating an endless drive chain 6 is a sprocket wheel 7, driven by a bevel wheel 8 in mesh with a bevel pinion 9, driven by a main power shaft 10. The mandrel A is retained in an upright position by gravitative rollers 11, preferably of grooved type, carried by slide boxes operable in inclined slots 1$^b$ in the upper ends of the standards 1.

B designates a reel bearing preferably located midway between the mandrel revolving rollers 2. This reel support comprises a lower bearing box member 12 provided with a leg 13 and a cap 14. The leg 13 of the reel bearing is adjustably held within a suitable base clamp 15.

C designates the reel of my apparatus. This reel includes a hollow carrier 16, preferably of double-bell shape, with its smallest diameter at its center, at which point said carrier is provided with a journal 17 rotatable within the reel bearing B, as seen most clearly in Figs. I and II. The reel carrier 16 is so supported as to provide for the operation of the mandrel A longitudinally therethrough when said mandrel is being revolved by the rollers 2, and also to provide for the operation of the reel around sections of said mandrel. The reel C may be rotated by any suitable means, such as a sprocket rim 18 surrounding the reel carrier and a drive chain 19 operable on said sprocket rim and driven by a sprocket wheel 20 on the main power shaft 10.

21 designates bobbins carried by the reel C and from which thread of any suitable description may be delivered to and wrapped around the mandrel A, while said mandrel is being slowly revolved and while the reel is rotating around a section of the mandrel. There are preferably two sets of bobbins 21 arranged side by side in the reel, and carried, for example, by the individual reel sections B', the two sets of bobbins being provided in order that two separate plies of thread made by any desired number of threads may be simultaneously made upon the mandrel A with one ply produced at one end of the reel and the other ply produced at the other end of the reel. The plies thus produced are accomplished at opposite sides of the longitudinal center of the reel, hence the threads entering the different plies are out of conflict with each other. Furthermore, by this arrangement, a very important result is accomplished in that the threads wrapped on the mandrel in one ply from one set of bobbins are wrapped diagonally of the mandrel in one direction, and those wrapped onto the mandrel in the other ply from the other set of bobbins are wrapped diagonally in the opposite direction, whereby the threads in the plies cross each other contrawise and take care of strains imposed on the fabric structure when a tire containing it is put into service.

Provision is made in the reel C for the rubberizing of the threads drawn from the bobbins 21 before these threads are delivered to and wrapped onto the mandrel A, and inasmuch as I preferably accomplish such rubberization by first applying liquid rubber to said threads, and thereafter apply plastic rubber to them, I have shown two separate sets of rubber holding receptacles incorporated in the reel, one of which contains liquid rubber and the other of which contains plastic rubber. The liquid rubber receptacles shown in the drawings are semiannular chambers 22 surrounding the reel carrier 16 and into which the threads from the bobbins 21 pass through suitable apertures in the walls of the chambers, as illustrated in Figs. I, II and III. The plastic rubber receptacles are cylinders 23 arranged around the chamber 22, longitudinally of the reel, into which the threads preferably pass after passing through the liquid rubber chambers. After passing through the plastic rubber cylinders 23, the threads extend through suitable spaced apertures 24 in the reel carrier 16, (see Figs. I, II and III), and then in their coated condition are delivered to the mandrel A onto which they are wrapped, due to the rotation of the reel C around the mandrel, each of the threads being caused to be properly laid on the mandrel adjacent to the thread last laid, owing to the mandrel being in continuous slow motion in a circular path extending in part through the reel.

It will be apparent that the liquid rubber in the chambers 22 of the reel C will be readily applied to the threads by the simple act of passing them through such liquid rubber. I deem it advisable to place the plastic rubber under pressure, in order that it may be held in a compact mass while the threads are passing therethrough, and be constantly pressed around the threads. The desired compacting of the plastic rubber may be secured by the following means illustrated in the drawings. In the plastic rubber cylinders 23 are followers 25 caused to exert pressure against the plastic rubber by riding on feed screws 26, each provided at one of its ends with a toothed wheel 27. The toothed wheels 27 are designed to intermittently come into engagement with lugs 28 projecting from the standards 1, or other fixed parts of the apparatus, so that during the rotation of the reel C, the feed screws 26 will be partially rotated at frequent enough intervals to cause the follower 25 to hold the plastic rubber under uniform pressure.

It will be obvious that when the threads delivered from the bobbins on the reel of my apparatus have been rubberized by passing them through rubber, in the manner hereinbefore described, and then winding them around the mandrel A, such threads are held taut and are wound on the mandrel under uniform tension. It will furthermore be obvious that inasmuch as there are a plurality of bobbins upon the reel C and the threads are delivered through the carrier of the reel at uniformly spaced points throughout the radius of said reel, the threads are constantly drawn around the mandrel with pulling action in as many directions as there are threads; hence, the mandrel is subjected to an equable action by all the threads, and its central position with respect to the delivery of the threads thereto from the reel is readily maintained. The threads wound upon the mandrel are wrapped uniformly thereon, as previously stated; but it will be evident that, inasmuch as these threads are rubberized, it is desirable to compress the threads in each double ply wrapped around the mandrel, in order that the threads may be condensed and the rubber thereon be compacted. To provide for such condensation and compression, I use in my apparatus the means about to be described.

29 designates a vertically adjustable bracket fitted to one of the standards of my apparatus. This bracket serves as a support for a sectional bearing ring 30, 31.

32 and 33 are sections of a presser roller carrier ring journaled in the bearing ring 30, 31.

34 are presser rollers journaled in forks 35 provided with shanks 36, which are loosely mounted in the carrier ring sections. These presser rollers are normally forced toward each other by springs 37. The carrier ring is rotated within the bearing ring by any suitable means, such as a sprocket chain applied to a sprocket 38 on the carrier ring sections, and a chain extending therefrom to any suitable part of the apparatus by which the chain may be driven. As the presser carrier roller ring revolves around the mandrel A, the presser rollers 34 are moved transversely around the mandrel, while the latter is being revolved, and the desired compression and condensation of the rubberized skeleton forming threads of the tire structure is acquired.

Under certain conditions, it may be desirable to maintain the rubber utilized for rubberizing the threads incorporated into a tire structure by the use of my apparatus in a heated condition, and to provide for the rubber being so maintained, I utilize a heating device comprising steam chambers 39, partially encircling the reel C beneath said reel, and to which steam may be conducted through suitable pipes. To confine the heat around the reel from the steam chambers, I may utilize a hood 40 that extends over the reel.

In Figs. V and VI I have illustrated the manner in which the plurality of plies of threads are arranged around the mandrel when they have been wound thereon by the use of my apparatus, and the means utilized to separate certain of said threads, so that they may be cut at the inner circumference of the mandrel, and then placed in their proper positions at the inner edges of the tire structure. When the mandrel has turned one complete revolution it is covered with a double ply of threads $a$, (shown diagrammatically in Fig. V), and before continuing the thread laying operation, a separator ring 41 is placed against the threads $a$, as shown in Fig. V. The mandrel is then rotated two complete revolutions to wind two double plies of threads $b$ and $b'$ around the first double ply $a$. As all of the threads are rubberized, the double ply $b$ will stick to the entire surface of the double ply $a$, excepting that covered by the separator ring 41. After forming the double ply of threads $b$ and $b'$, bead rings or stiffeners 43 are laid on the side faces of the fabric structure and a separator ring 42 is positioned to prevent the bead rings and threads $b'$ from sticking to the next succeeding thread layer. The mandrel is then turned three complete revolutions to produce the double plies of threads $c$, $c'$ and $c''$, thereby completing the thread winding operation.

In forming a tire of the clencher type, having separable inner edges, the fabric structure shown in Fig. V may be cut and folded to lie as shown in Fig. VI. The first step in this operation is to sever the three outer plies of fabric threads $c$, $c'$, and $c''$, at their inner circumferences, (indicated by arrow $x$ in Fig. V). The separator ring 42 is then removed and the three outer fabric plies are pressed around the bead rings as seen in Fig. VI. The fabric plies $b$ and $b'$ are severed to produce the inclined edges $d$, (Fig. VI), and the edges of the three outer fabric plies are trimmed to match said inclined edges. The final steps consist in removing the separator ring 41, severing the inner fabric ply $a$ and folding its severed edges over the edges of the outer fabric plies, as seen in Fig. VI. The function of the separator rings 41 and 42 is to prevent certain of the rubberized fabric plies from sticking to other plies at points adjacent to the separable edges of the tire, thereby allowing different plies to be moved independently of each other in producing the fabric structure shown in Fig. VI.

While I have very specifically described a certain number of thread plies, separator rings between said plies, and bead rings around which certain plies are folded, it will be understood that my invention is not in any way limited to the forming of a fabric structure in this manner. Any desired number of fabric plies may be formed on the mandrel, and the method of severing and folding such plies may be varied to produce tires of various different types.

It is to be clearly understood that my method is one intended to be followed only for the purpose of producing the fabric skeletons of hollow tires, or other objects comprising fabric bodies similar to those entering into the skeletons of hollow tires. It will further be understood that when a fabric skeleton has been made according to my method, raw rubber may be applied to such skeleton in accordance with any of the well known methods of applying such rubber to afford the usual rubber cushion of the tire, and the tire be then vulcanized by any usual method. The application of the raw rubber to the skeleton and the vulcanization may take place while the skeleton fabric remains on the mandrel which it has been formed on, or it may be removed from such mandrel before the vulcanization.

In concluding the description of my method, I desire to call attention to certain advantages gained by practising the method as compared with the practice heretofore followed in making the fabric skeletons of hollow tires, as follows: By providing a revolving mandrel and a rotatable winder, such as a reel C, and providing for the mandrel being moved at a slower speed than the speed at which the winder is rotated, I am enabled to lay up the rubberized threads on the mandrel in plies comprising closely arranged coils so that the rubber incasing each thread is in contact throughout all of the coils, and when the completed tire into which the fabric skeleton enters is produced, including the vulcanization of the rubber, the rubber around the threads is united in a solid mass with the threads completely embedded therein, each thread being effectually cushioned from every other thread and from all portions of the same thread.

By the use of my apparatus, employed in carrying out my method, I am enabled to produce a fabric skeleton structure for tires, in which all of the threads are not only completely rubberized, but are also placed under uniform tension; in which puckering of the fabric commonly present in tire skeletons as ordinarily made is avoided; in which the fabric threads are so completely incased as to prevent their deterioration by exposure to the elements, or by friction against each other; and in which the objectionable laps and splices common to tire fabric skeletons as heretofore made are lacking. It is to be noted that the threads passing from the two winders are wound onto the mandrel in substantially parallel planes, the adjacent threads of each ply being substantially parallel with each other and those of one ply being oppositely inclined to those of the other. Each coil of thread is preferably formed by laying the thread diagonally across one side of the mandrel to form approximately one-half of the coil and then laying the thread on the opposite side of the mandrel at a point approximately opposite to and approximately parallel with the thread forming the first half of the coil.

In carrying out the preferred form of my method, uniform coils of thread are formed on the rotating mandrel by rotating a thread winder around said mandrel at a point where the thread after passing from the thread winder will lie diagonally on the mandrel irrespective of the rotary movement of the mandrel.

I claim:—

1. In the art of making fabric tire skeletons, the method which comprises winding thread around a rotating annular mandrel, each coil of thread being formed by laying the thread diagonally across one side of the mandrel to form approximately one-half of the coil and then laying the thread on the opposite side of the mandrel at a point approximately opposite to and approximately parallel with the thread forming the first half of the coil.

2. In the art of making fabric tire skeletons, the method which consists in simultaneously and helically winding two threads upon a rotating annular mandrel in superimposed plies, the threads of one ply being oppositely inclined to those of the other.

3. In the art of making fabric tire skeletons, the method which consists in simultaneously and helically winding threads in substantially parallel planes upon a rotating annular mandrel at two different points whereby two plies of threads will be superimposed on the mandrel, the adjacent threads of each ply being substantially parallel, and those of one ply being oppositely inclined to those of the other.

4. In the art of making fabric tire skeletons, the method which comprises winding thread around a rotating annular mandrel in a plane at such a point and at such a speed relative to the rotation of the mandrel that the thread will lie diagonally on the rotating annular mandrel irrespective of the direction of rotation of said annular mandrel.

5. In the art of making fabric tire skeletons, the method which comprises winding thread around the body of a rotating annular mandrel by passing the thread through the body of said annular mandrel in such a plane at a point between said body and the axis of the annular mandrel and at such a speed relative to the rotation of the mandrel that the thread will lie diagonally on the mandrel irrespective of the direction of rotation of said mandrel.

MARK A. DEES.

In the presence of—
A. J. McCauley,
E. B. Linn.